US007714935B2

(12) United States Patent
Hara

(10) Patent No.: US 7,714,935 B2
(45) Date of Patent: May 11, 2010

(54) DATA STRUCTURE FOR WAVEFORM SYNTHESIS DATA AND METHOD AND APPARATUS FOR SYNTHESIZING WAVEFORM

(75) Inventor: Tomomi Hara, Kanagawa (JP)

(73) Assignee: Leader Electronics Corporation, Yokohama-shi, Kanagawa-ken (JP)

( * ) Notice: Subject to any disclaimer, the term of this patent is extended or adjusted under 35 U.S.C. 154(b) by 1081 days.

(21) Appl. No.: 10/447,279

(22) Filed: May 29, 2003

(65) Prior Publication Data

US 2004/0034530 A1  Feb. 19, 2004

(30) Foreign Application Priority Data

May 31, 2002 (JP) .............................. 2002-159629

(51) Int. Cl.
*H04N 5/06* (2006.01)
(52) U.S. Cl. ..................................................... 348/521
(58) Field of Classification Search ......... 704/258–269; 348/521–524
See application file for complete search history.

(56) References Cited

U.S. PATENT DOCUMENTS

| | | | |
|---|---|---|---|
| 6,255,576 B1 * | 7/2001 | Suzuki et al. ................. | 84/604 |
| 6,687,674 B2 * | 2/2004 | Suzuki et al. ................ | 704/268 |
| 7,069,217 B2 * | 6/2006 | McLaughlin et al. ........ | 704/269 |

FOREIGN PATENT DOCUMENTS

| | | |
|---|---|---|
| JP | 05-030377 | 2/1993 |
| JP | 06-121279 | 4/1994 |
| JP | 08-293734 | 11/1996 |
| JP | 2000-056773 | 2/2000 |

OTHER PUBLICATIONS

Japan Patent Application (Application No. 2002-159629) Notice of Reason for Rejection with full English language translation (17 pages).
Office Action (Japanese Application No. 2002-159629) mailed Sep. 25, 2007 with English language tranlsation.

* cited by examiner

*Primary Examiner*—Angela A Armstrong
(74) *Attorney, Agent, or Firm*—Fish & Richardson P.C.

(57) ABSTRACT

A highly integrated data structure for synthesizing a waveform is provided for facilitating integrated handling of the data. The data structure for waveform synthesis data or use in generation of a target waveform comprises, at a macro level, a macro waveform value data field for storing a waveform value data section including source waveform value data for use in the generation of the target waveform, and a macro (first) header including control data for forming a macro waveform in the target waveform using the source waveform value data included in the data field. At a micro level, the data structure according to the present invention comprises a micro waveform value data field, and a micro (second) header for generating a micro waveform in the target waveform using the waveform value data included in the micro waveform value data field.

3 Claims, 15 Drawing Sheets

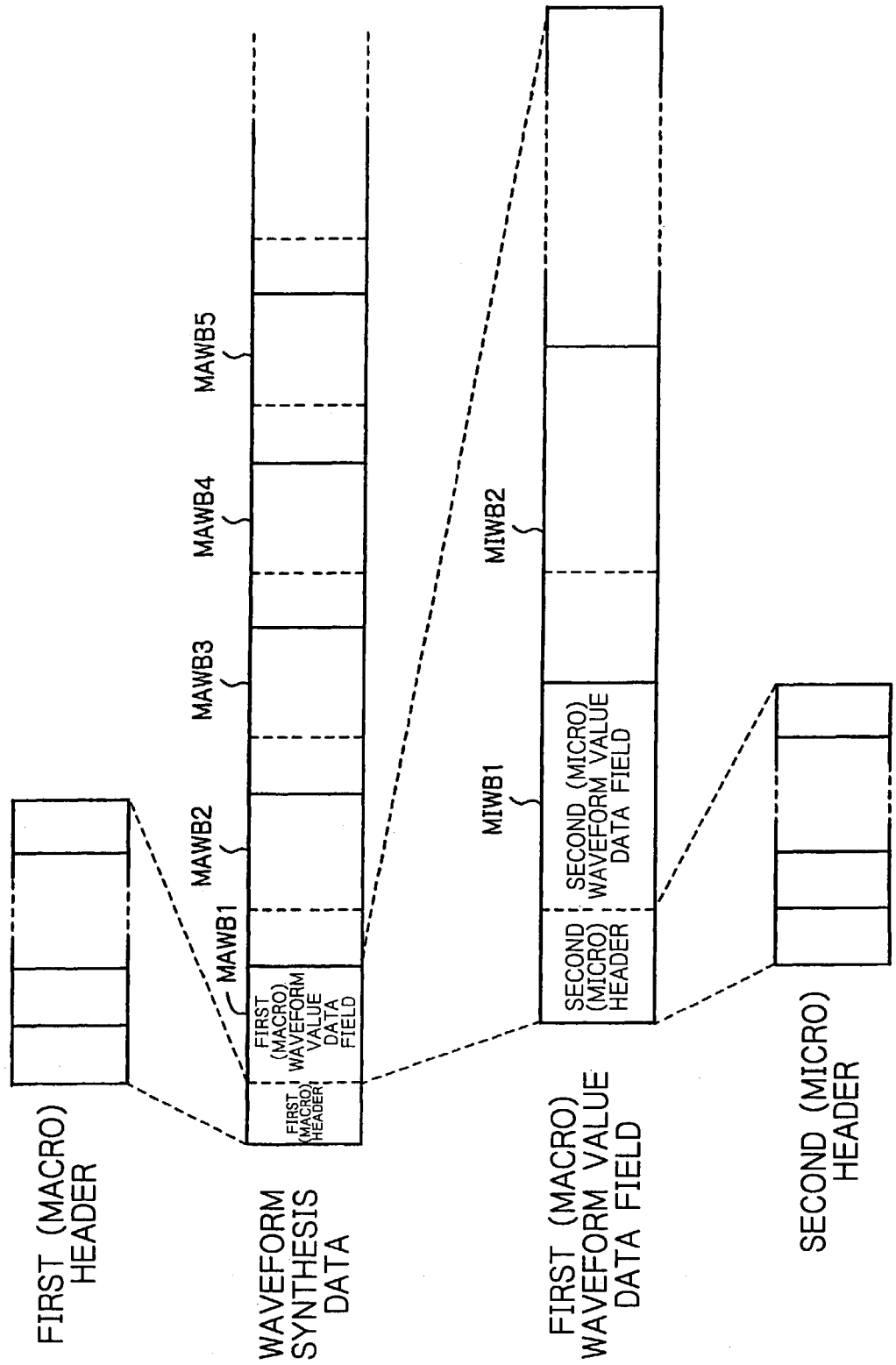

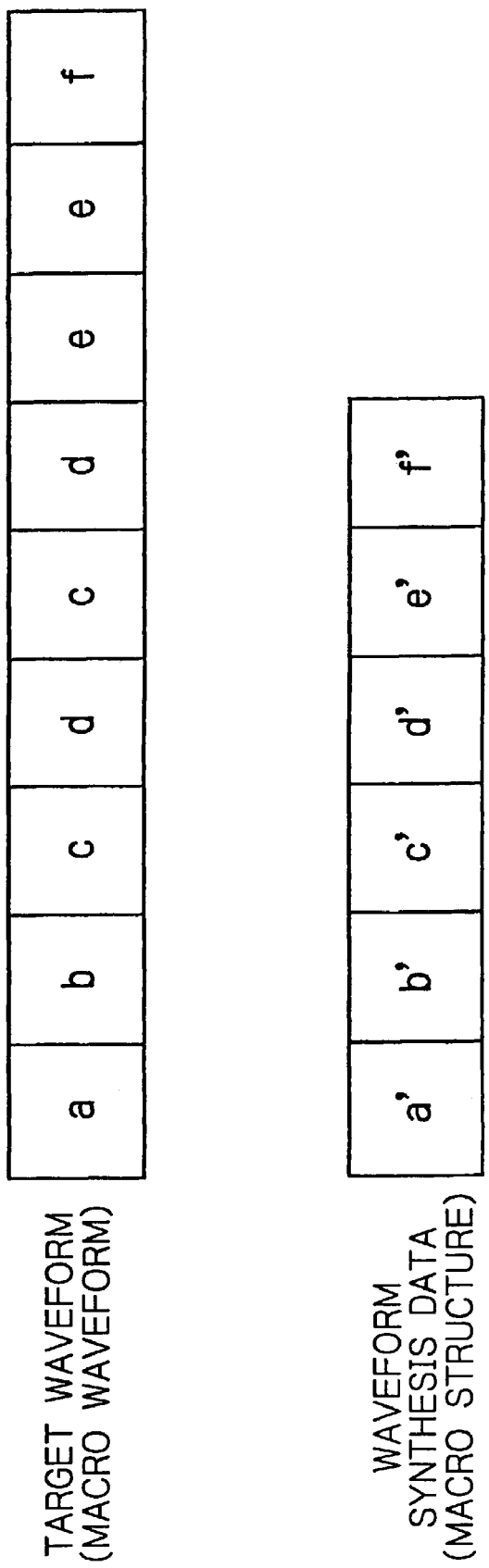

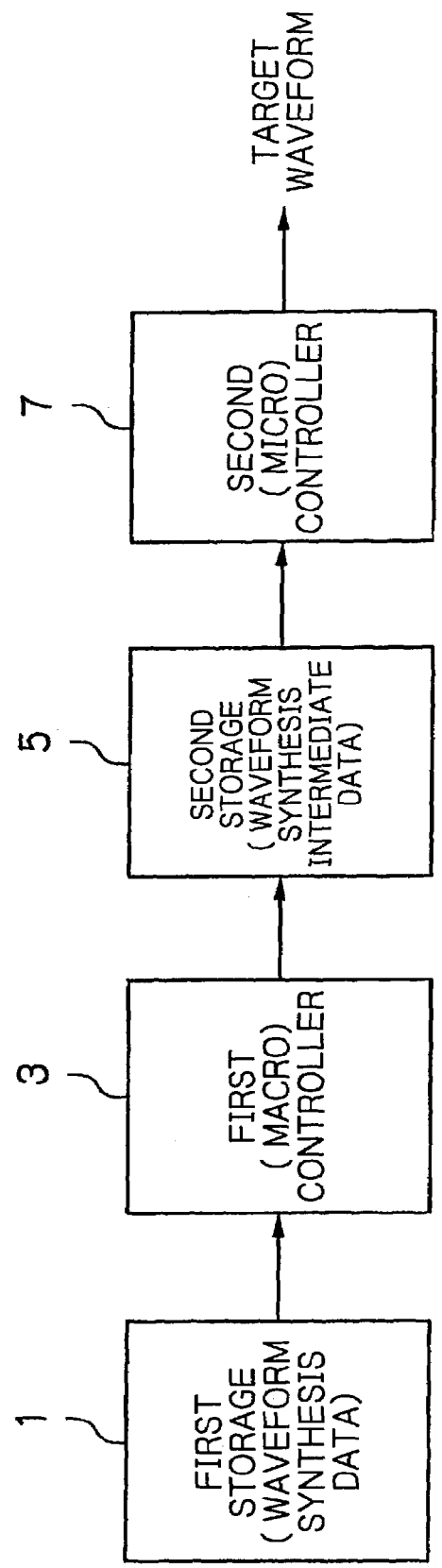

Fig. 4

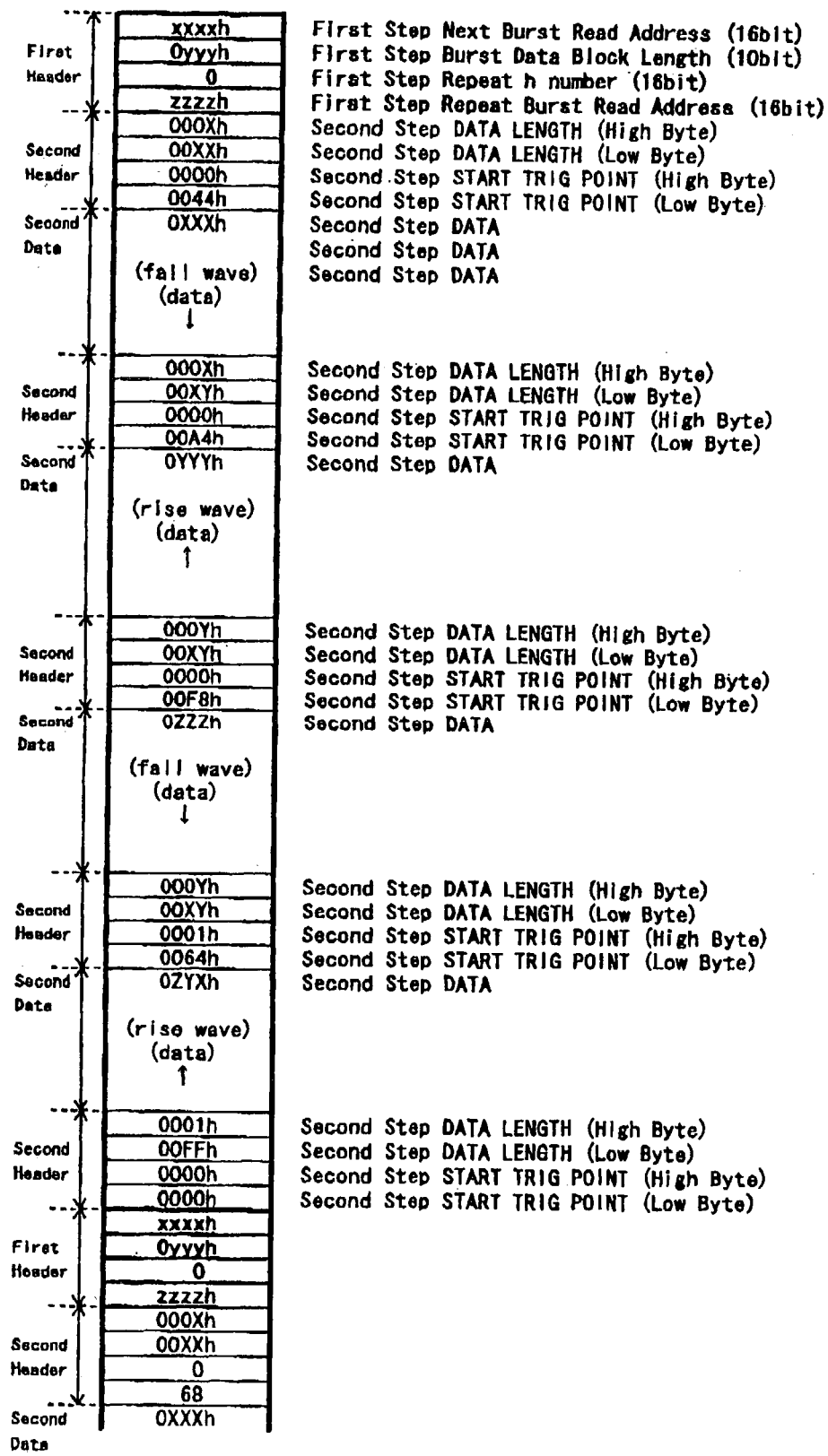

| | | |
|---|---|---|
| First Header | xxxxh | First Step Next Burst Read Address (16bit) |
| | 0yyyh | First Step Burst Data Block Length (10bit) |
| | 0 | First Step Repeat h number (16bit) |
| | zzzzh | First Step Repeat Burst Read Address (16bit) |
| Second Header | 000Xh | Second Step DATA LENGTH (High Byte) |
| | 00XXh | Second Step DATA LENGTH (Low Byte) |
| | 0000h | Second Step START TRIG POINT (High Byte) |
| | 0044h | Second Step START TRIG POINT (Low Byte) |
| Second Data | 0XXXh | Second Step DATA |
| | | Second Step DATA |
| | (fall wave) (data) ↓ | Second Step DATA |
| Second Header | 000Xh | Second Step DATA LENGTH (High Byte) |
| | 00XYh | Second Step DATA LENGTH (Low Byte) |
| | 0000h | Second Step START TRIG POINT (High Byte) |
| | 00A4h | Second Step START TRIG POINT (Low Byte) |
| Second Data | 0YYYh | Second Step DATA |
| | (rise wave) (data) ↑ | |
| Second Header | 000Yh | Second Step DATA LENGTH (High Byte) |
| | 00XYh | Second Step DATA LENGTH (Low Byte) |
| | 0000h | Second Step START TRIG POINT (High Byte) |
| | 00F8h | Second Step START TRIG POINT (Low Byte) |
| Second Data | 0ZZZh | Second Step DATA |
| | (fall wave) (data) ↓ | |
| Second Header | 000Yh | Second Step DATA LENGTH (High Byte) |
| | 00XYh | Second Step DATA LENGTH (Low Byte) |
| | 0001h | Second Step START TRIG POINT (High Byte) |
| | 0064h | Second Step START TRIG POINT (Low Byte) |
| Second Data | 0ZYXh | Second Step DATA |
| | (rise wave) (data) ↑ | |
| Second Header | 0001h | Second Step DATA LENGTH (High Byte) |
| | 00FFh | Second Step DATA LENGTH (Low Byte) |
| | 0000h | Second Step START TRIG POINT (High Byte) |
| | 0000h | Second Step START TRIG POINT (Low Byte) |
| First Header | xxxxh | |
| | 0yyyh | |
| | 0 | |
| | zzzzh | |
| Second Header | 000Xh | |
| | 00XXh | |
| | 0 | |
| | 68 | |
| Second Data | 0XXXh | |

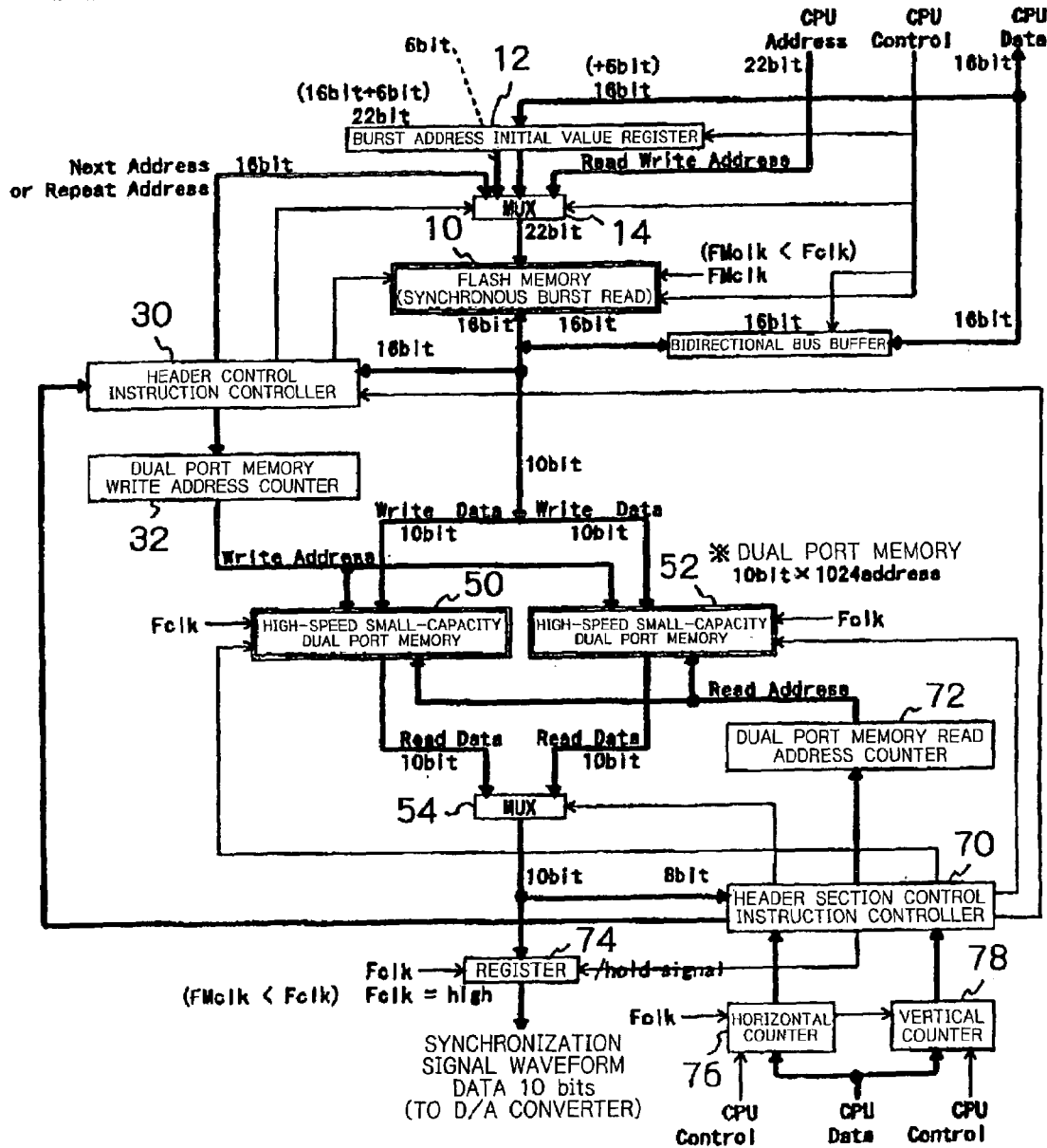

Fig. 8A 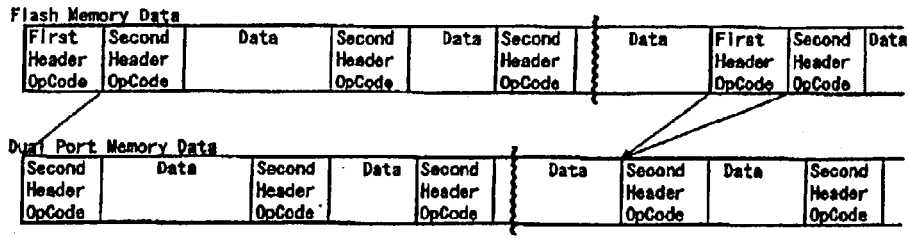

Fig. 8B 

Fig. 8C 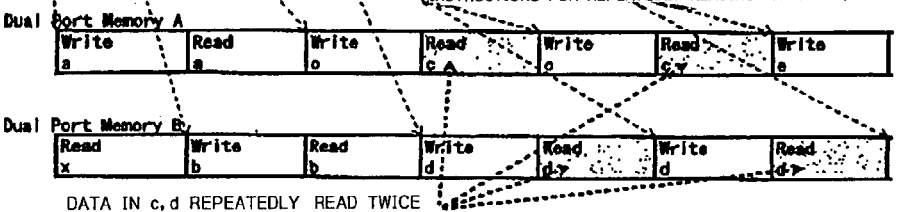

DATA IN c, d REPEATEDLY READ TWICE

Fig. 8D TIME SERISE DIRECTION →
HORIZONTAL/VERTICAL COUNTER ADDRESS
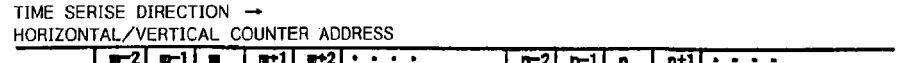

Fig. 8E SYNCHRONIZATION SIGNAL WAVEFORM DATA

Fig. 8F WAVEFORM AFTER D/A CONVERSION
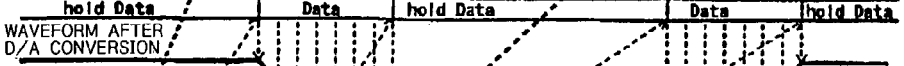

Fig. 8G 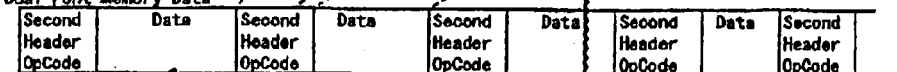

INCLINED LEVEL DATA ON WAVEFORM AT CHANGING POINT OF SYNCHRONIZATION SIGNAL

INSTRUCTIONS FOR READING DATA ON NUMBER OF WORDS SPECIFIED BY INSTRUCTION WORD FROM DUAL PORT MEMORY WHEN HORIZONTAL/VERTICAL COUNTER ADDRESS REACHES m.

INSTRUCTIONS FOR READING DATA ON NUMBER OF WORDS SPECIFIED BY INSTRUCTION WORD FROM DUAL PORT MEMORY WHEN HORIZONTAL/VERTICAL COUNTER ADDRESS REACHES n.

1H HEADER PROCESSING FLOW

※ Ne = Next Address

※ Re = Repeat Address

※ Rep h num = Repeat h number

DATA STRUCTURE FOR WAVEFORM SYNTHESIS DATA AND METHOD AND APPARATUS FOR SYNTHESIZING WAVEFORM

BACKGROUND OF THE INVENTION

The present invention relates to the field of waveform synthesis or signal generation, and more particularly, to a data structure for use in waveform synthesis and a method and apparatus for synthesizing a waveform using this structure.

Conventionally, in the field of video processing and the like, a variety of signal generators are known for generating a test signal. For example, a video signal reproducing apparatus disclosed in Laid-open Japanese Patent Application No. 6-121279 comprises a ROM for storing only level data of a sloping portion (a transient region and a neighboring portion therearound) of synchronization signals to be generated; and a timing control circuit for generating a variety of timing signals. The video signal reproducing apparatus is configured to generate a basic waveform for a synchronization signal using the level data and one timing signal, and modify the basic waveform using other timing signals to generate other synchronization signals having several waveforms. The video signal reproducing apparatus only needs a small capacity of storage because less data is required for waveforms. However, in the configuration described above, timing data other than level data is stored in the timing control circuit separate from the ROM for storing level data, so that the level data for generating waveforms is separated from the timing control data and stored independently of the timing control data.

A high vision video signal generator circuit disclosed in Laid-open Japanese Patent Application No. 5-30377 comprises ROM1-ROM5 for storing waveforms of synchronization signals in five types of horizontal periods; and ROM 6 for storing an order in which ROM1-ROM5 are selected in order to generate a synchronization signal for one frame. Like the aforementioned video signal reproducing apparatus, the high vision video signal generator circuit separately stores waveform value data and timing control data which are separated from each other.

Further, conventionally, when synchronization signal waveform data is processed at a high data rate, a plurality of memories having a reading speed lower than the data rate, if employed, is connected in parallel to achieve a memory reading speed corresponding to the data rate. Specifically, data from a plurality of memories connected in parallel are multiplexed to generate a waveform of a synchronization signal. For this configuration, a larger number of memories is required to generate a synchronization signal at a higher data rate.

SUMMARY OF THE INVENTION

It is therefore an object of the present invention to provide a data structure for waveform synthesis data which facilitates collective handling, i.e., highly integrated data.

It is another object of the present invention to provide a programmable data structure for waveform synthesis data which can facilitate a modification to a target waveform through a modification to a program.

It is a further object of the present invention to provide a waveform synthesis method and apparatus for forming a target waveform using waveform synthesis data which has the above-mentioned data structure.

It is a further object of the present invention to provide a program for executing the foregoing method.

To achieve the above object, a data structure for waveform synthesis data for use in generation of a target waveform according to the present invention includes a) a waveform value data section including source waveform value data for use in the generation of the target waveform, and b) a control section including control data for forming the target waveform using the source waveform value data included in the waveform value data section. According to the present invention, the source waveform value data may be data representative of at least one waveform level.

Also, according to the present invention, the target waveform may include a plurality of waveform unit sections in a first predetermined order, wherein the plurality of waveform unit sections may include a plurality of types of unique waveform unit sections different from one another. The waveform synthesis data may include waveform unit section data blocks associated with the plurality of unique waveform unit sections in a second predetermined order. The waveform unit section data block may include a first waveform value data section including data for generating the associated unique waveform unit section, and a first control section including an ordering data for changing the arrangement of the unique waveform unit sections in the first predetermined order to the arrangement of the unique waveform unit section in the predetermined second order. In this event, the ordering data may include data for specifying a unique waveform unit section next to the unique waveform unit section in the second predetermined order.

Also, according to the present invention, the plurality of waveform unit sections may include a plurality of continuous repetitions of at least one of the unique waveform unit sections, and the ordering data associated with the repeated unique waveform unit section may include repetition data for repeating the unique waveform unit section. In this event, the repetition data may include the number of repetitions of the repeated unique waveform unit section; and return destination data for specifying the repeated unique waveform unit section.

Further, according to the present invention, the plurality of waveform unit sections may include a sequence of unique waveform unit sections repeated a plurality of times, wherein the sequence is comprised of repetitions of a plurality of the unique waveform unit sections different from one another. The sequence of unique waveform unit sections may include a head unique waveform unit section; and at least one subsequent unique waveform unit sections including a last unique waveform unit section. In this data structure, a) the head unique waveform unit section may include, as the repetition data, the number of repetitions corresponding to the plurality of times of the sequence of unique waveform unit sections, and return destination data for specifying an immediately following unique waveform unit section in the at least one subsequent unique waveform unit sections, and b) the last unique waveform unit section may include return destination data for specifying the head unique waveform unit section as the repetition data.

Further, according to the present invention, the waveform unit section may comprise at least one waveform segment section, wherein each waveform segment section comprises one constant level portion in which a level does not change, and one level changing portion in which a level changes. In this event, the first waveform value data section of the waveform unit section data block may include a waveform segment section data block associated with each waveform segment section. The waveform segment section data block may include a second waveform value data section including only data indicative of the level of the one level changing portion of the waveform segment section, and a second control section including timing data. The timing data may indicate a period in which level data is available associated with the level changing portion included in the second waveform value data section. Furthermore, the timing data may indicate the constant level portion in a period until the period in which the level data is available.

The present invention also provides a computer readable recording medium having recorded thereon waveform synthesis data having the foregoing data structure.

In accordance with another aspect of the present invention, a waveform synthesis method for synthesizing a target waveform from waveform synthesis data comprises the steps of receiving the waveform synthesis data having the data structure, acquiring the control section and the waveform value data section from the waveform synthesis data, and forming target waveform data representative of the target waveform using the data included in the waveform value data section based on the control data included in the control section.

The present invention also provides a waveform synthesis method for synthesizing a target waveform from waveform synthesis data, wherein the target waveform includes a plurality of waveform unit sections in a first predetermined order, the plurality of waveform unit sections include a plurality of types of unique waveform unit sections different from one another, and the waveform synthesis data includes waveform unit section data blocks associated with the plurality of unique waveform unit sections in a second predetermined order. The waveform synthesis method comprises the steps of a) receiving waveform synthesis data having the data structure, and b) forming the target waveform data by arranging the first waveform value data sections included in a plurality of the waveform unit section data blocks in the second predetermined order within the waveform synthesis data such that the first waveform value data sections are reordered in the first predetermined order in accordance with the ordering data included in the first control section within each waveform unit section data block.

According to the present invention, said step of arranging the first waveform value data sections to form the target waveform data may include i) acquiring the first control section and the first waveform value data section associated with each unique waveform section from the waveform unit section data block associated with each unique waveform section, ii) generating the first waveform value data section of each unique waveform section, and iii) acquiring the waveform unit section data block of the next unique waveform section using the ordering data included in the first control section of the waveform unit section data block of each unique waveform section, whereby the first waveform value data sections of said unique waveform sections can be arranged in the first predetermined order.

Also, according to the present invention, the predetermined first order may include a plurality of continuous repetitions of one the unique waveform unit section. The repetition data associated with the repeated unique waveform unit section may include repetition data for repeating the unique waveform unit section. The repetition data may include the number of repetitions the unique waveform unit section is repeated, and return destination data for specifying the repeated unique waveform unit section. The waveform synthesis method may further include the step of sequentially arranging the first waveform value data section associated with the repeated unique waveform unit section a number of times corresponding to the number of repetitions based on the repetition data in the first control section of the waveform unit section data block associated with the repeated unique waveform unit section within the waveform synthesis data. In this case, the step of arranging may include the steps of acquiring the waveform unit section data block of the unique waveform unit section repeated the number of times corresponding to the number of repetitions included in the repetition data by using the return destination data in the repetition data included in the first control section of the waveform unit section data block of the repeated unique waveform unit section, to thereby repeatedly generate the first waveform value data section of the repeated unique waveform unit section the number of repetitions, and ii) after the step of generating the first waveform value data section, acquiring the waveform unit section data block of the next unique waveform unit section by using the ordering data included in the first control section of the repeated unique waveform unit section.

Alternatively, the first predetermined order may include a plurality of continuous repetitions of a sequence of unique waveform unit sections comprised of a plurality of the unique waveform unit sections different from one another, where the unique waveform unit sections are arranged in sequence. The sequence of unique waveform unit sections may include a head unique waveform unit section, and at least one of subsequent unique waveform unit sections including a last unique waveform unit section. The head unique waveform unit section may include, as the repetition data, data indicative of a number of repetitions corresponding to the plurality of times of the sequence of unique waveform unit sections, and return destination data for specifying an immediately following unique waveform unit section within the at least one subsequent unique waveform unit section. The last unique waveform unit section may include, as the repetition data, return destination data for specifying the head unique waveform unit section. The waveform synthesis method may further include the step of arranging a sequence of the first waveform value data sections associated with the sequence of unique waveform unit sections sequentially a number of times corresponding to the number of repetitions based on the repetition data in the first control section of the waveform unit section data block associated with the sequence of unique waveform unit sections within the waveform synthesis data. In this case, the step of arranging a sequence of the first waveform value data sections may include the steps of i) acquiring the first control section and the first waveform value data section associated with the head unique waveform unit section from the waveform unit section data block associated with the head unique waveform unit section, ii) generating the first waveform value data section of the head unique waveform unit section, iii) sequentially acquiring subsequent unique waveform unit sections of the sequence of unique waveform unit sections and the waveform unit section data block of the last unique waveform unit section, using the return destination data within the repetition data included in the first control section of the waveform unit section data block of the head unique waveform unit section, to generate said first waveform value data sections of the sequentially subsequent unique waveform unit section and the last unique waveform unit section, iv) repeatedly acquiring the waveform unit section data block of the sequence of unique waveform unit sections, using the return destination data within the repetition data of the waveform unit section data block of the last unique waveform unit section, to repeatedly generate the first waveform value data sections of the sequence of unique waveform unit sections the number of repetitions, and v) after the step of generating the first waveform value data section, acquiring the waveform synthesis data for the next unique waveform unit section using the ordering data included in the first control section of the last unique waveform unit section.

The present invention further provides a waveform synthesis method for synthesizing a target waveform from waveform synthesis data, wherein the waveform includes at least one waveform segment section comprising one constant level portion in which a level does not change, and one level changing portion in which a level changes. The waveform synthesis method includes the steps of a) receiving waveform synthesis data having the data structure, b) forming target waveform data representative of the constant level portion from the timing data in the second control section within the waveform segment section data block of the waveform synthesis data by maintaining the level constant until a period in which the level data is available, and c) forming target waveform data representative of the level changing portion using the level data from the second waveform value data section of the waveform segment section data block when the available period indicated by the timing data is reached.

The present invention further provides a waveform synthesis program causing a computer to execute a waveform synthesis method, and a computer readable recording medium having recorded thereon the waveform synthesis program.

In accordance with another aspect of the present invention, a waveform synthesizer for synthesizing a target waveform from waveform synthesis data includes a) storing means for storing waveform synthesis data having the data structure, and b) control means coupled to the storing means for controlling the data included in the waveform value data section of the waveform synthesis data in response to the control data included in the control section of the waveform synthesis data received from the storing means to form target waveform data representative of a target waveform.

The present invention further provides a waveform synthesis apparatus for synthesizing a target waveform from waveform synthesis data, wherein the target waveform includes a plurality of waveform unit sections in a first predetermined order. The plurality of waveform unit sections comprises a plurality of types of unique waveform unit sections different from one another. Each of the waveform unit sections comprises at least one waveform segment section. The waveform segment section comprises a constant level portion in which a level does not change and a level changing portion in which a level changes. The waveform synthesis apparatus includes a) first storing means for storing waveform synthesis data having the aforementioned data structure, and a plurality of waveform unit section data blocks associated with the plurality of types of unique waveform unit sections different from one another in a second predetermined order, b) first control means coupled to the first storing means for controlling each waveform unit section data block received from the first storing means to generate a plurality of the waveform segment section data blocks in the first order by arranging in the first predetermined order the waveform segment section data blocks included in the respective first waveform value data sections from the plurality of types of waveform unit section data blocks different from one another in the second predetermined order in accordance with control data included in the first control section within each waveform unit section data block, c) second storing means coupled to the first control means for storing a plurality of the waveform segment section data blocks in the first order from the first control means, and d) second control means coupled to the second storing means for controlling each waveform segment section data block received from the second storing means to form target waveform data representative of the constant level portion from the timing data in the second control section within the waveform segment section data block received from the second storing means by maintaining the level constant until a period in which the level data is available, and to form target waveform data representative of the level changing portion using the level data from the second waveform value data section of the waveform segment section data block when the available period indicated by the timing data is reached.

According to the present invention, the first storing means may be a flash memory, and the second storing means may include two dual port memories which are alternately used.

BRIEF DESCRIPTION OF THE DRAWINGS

FIG. 1 is a diagram showing one embodiment of a data structure for waveform synthesis data according to the present invention;

FIG. 2 is a diagram showing a target waveform and a data structure for synthesizing the waveform for showing an example of a shared waveform at a macro level;

FIG. 3 is a block diagram illustrating a waveform synthesizer A according to one embodiment of the present invention for synthesizing a target waveform using waveform synthesis data which has the data structure according to the present invention;

FIG. 4 is a diagram showing a data structure for data for synthesizing a synchronization signal for a video signal in one embodiment of the data structure in FIG. 1;

FIG. 6 is a block diagram illustrating a synchronization signal generator B according to one embodiment of the present invention which uses synchronization signal synthesis data having the data structure shown in FIG. 4;

FIGS. 8A to 8G are diagrams generally showing data processing in the generator B in FIG. 6;

DETAILED DESCRIPTION OF THE PREFERRED EMBODIMENTS

Figure 5A:
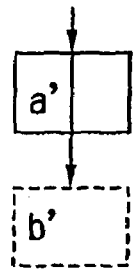
FIGS. 5A to 5G are diagrams each showing an order/arrangement pattern of macro waveforms which are available with a 1H header.

Next, the present invention will be described in detail with reference to the accompanying drawings.

FIG. 1 shows one embodiment of a data structure for waveform synthesis data for generating a target waveform in accordance with the present invention. In this embodiment, the waveform synthesis data has been "compressed" at two different levels, i.e., a first stage compression at a macro level and a second stage compression at a micro level. Alternatively, the waveform synthesis data may be compressed at any of the two levels, or at three or more levels. Assume in this embodiment that the target waveform is comprised of at least one plurality of "waveform unit sections" (hereinafter also called the "macro waveforms"), and the waveform unit section or macro waveform is comprised of at least one plurality of "waveform segment sections" (hereinafter also called the "micro waveforms"). For example, a macro waveform may extend over one horizontal (1H) period of a video signal, while a micro waveform may fall within the 1H period. The compression used herein may include omission of data related to a waveform portion in which the same waveform value continues, sharing of data in a waveform portion having the same waveform, and other compressions. The compression at the macro level refers to the compression of data, for example, in a waveform extending over a certain predetermined period, i.e., in a macro waveform, while the compression at the micro level refers to the compression of data in a waveform extending less than the predetermined period, i.e., in a micro waveform. A waveform synthesizer A in FIG. 1 "extends" or decompresses such compressed waveform synthesis data using only data contained in the waveform synthesis data to form data for a target waveform.

Now, the data structure for the waveform synthesis data will be described in detail with reference to FIG. 1. As illustrated, the waveform synthesis data is comprised of a plurality of macro waveform data blocks MAWB1-MAWB5 . . . in a macro structure. Each of the macro waveform data blocks is associated with at least one macro waveform corresponding thereto in a target waveform. Each macro waveform data block MAWB has a structure comprised of a first header (also called the "macro header"), and a first waveform value data field (also called the "macro waveform value data field"). The macro waveform value data field includes data required for forming a macro waveform such as waveform value data. The macro header in turn includes data associated with an instruction or control for using or decompressing data in the macro waveform value data field to form at least one corresponding macro waveform within the target waveform. The macro waveform value data field corresponding to each macro waveform further has a micro structure, as shown, which is comprised of micro waveform data blocks MIWB1, MIWB2, . . . , respectively corresponding to the at least one plurality of micro waveforms. As shown, each micro waveform data block MIWB is comprised of a second header (also called the "micro header") and a second waveform value data field (also called the "micro waveform value data field"). The micro waveform value data field includes data on waveform values required for forming each micro waveform. The waveform value data may include, for example, only a portion of waveform in which the level changes. The micro header includes data associated with an instruction or control for forming the micro waveform by using or decompressing the waveform value data. It should be noted that in FIG. 1, although the respective data blocks or data fields are drawn to have a uniform length, they are not required to have the same length.

Next, control data in the macro header will be described in detail. The control data in the macro header has a function of defining a method of using data in an associated waveform value data field for purposes of sharing data at the macro level. The data may be shared, for example, when one and the same macro waveform is continuously repeated; when a plurality of continuous macro waveforms are continuously repeated; when a sequence of macro waveforms separate from one another are continuously repeated; and the like.

FIG. 2 shows an example as to how waveforms are shared at the macro level. In the shown example, a target waveform is comprised of nine macro waveforms a, b, c, d, c, d, e, e, f. The target waveform includes two continuous repetitions of macro waveforms c, d, and two continuous repetitions of waveform e. Therefore, the target waveform includes only six "unique" macro waveforms a, b, c, d, e, f which are minimally required for the formation thereof. For such a target waveform, waveform synthesis data can be made up of data a', b', c', d', e', f' associated with the macro waveforms a, b, c, d, e, f in the shown order, as can be seen in FIG. 2. In this case, data on the redundant macro waveforms c, d, e are deleted. Corresponding to the deletion, the waveform synthesis data incorporates information for restoring the repetitions in the macro header. On the other hand, an example of a compressed waveform at the micro level may include only waveform value data in a level changing portion, as mentioned above, and omit waveform value data in a constant level portion. Corresponding to the omission, the micro header must include timing information for specifying the position of the level changing portion in the micro waveform. The compression accomplished by such sharing, omission, and the like can save a required memory. Also, the waveform value data field may be integrally related to the header associated therewith, thereby increasing the integrity of the overall waveform data. The increased integrity results in higher programmability of the waveform synthesis data.

FIG. 3 illustrates in block diagram form a waveform synthesizer A according to one embodiment of the present invention for synthesizing a target waveform using waveform synthesis data having the shown data structure. The waveform synthesizer A comprises a first storage 1; a first or a macro controller 3; a second storage 5; and a second or a micro controller 7, as illustrated, for generating a target waveform. The first storage 1 stores waveform synthesis data having the data structure shown in FIG. 1. In this embodiment, the stored waveform synthesis data is compressed at two stages, i.e., macro compression and micro compression. The macro controller 3, which receives such waveform synthesis data, functions to decompress the waveform synthesis data at the macro level to generate intermediate data for waveform synthesis. Specifically, the macro controller 3 receives respective macro waveform data blocks (for example, MAWB 1-5 and the like) in the waveform synthesis data, and uses information in macro header of each data block to control the associated macro waveform value data field. In this way, the macro controller 3 converts the waveform synthesis data having both the macro structure and micro structure to intermediate data for waveform synthesis having only the micro structure, i.e., intermediate data remaining compressed only at the micro level. The second storage 5 receives the converted intermediate data for waveform synthesis, and temporarily stores or buffers the received data. Next, the micro controller 7, which receives the intermediate data temporarily stored in the second storage 5, functions to decompress the intermediate data at the micro level to generate target waveform data which make up the target waveform. Specifically, the micro controller 7 receives respective micro waveform data blocks (for example, MIWB1, 2, and the like) in the intermediate data, and uses micro header information in each data block to control the associated micro waveform value data field. In this way, the micro controller 7 converts the intermediate data for waveform synthesis having the micro structure to the target waveform data which is completely decompressed. As appreciated from FIG. 3, the illustrated waveform synthesizer A can simply change a target waveform, which is to be synthesized from the waveform synthesis data, only by replacing the waveform synthesis data stored in the first storage 1.

Next, FIG. 4 shows one embodiment of the data structure shown in FIG. 1 particularly for synthesizing a synchronization signal for a video signal. The shown data structure is comprised of a large number of one-horizontal period (1H) waveform data blocks in a macro structure, each of which is comprised of a first header (or a 1H header), and a 1H waveform value data field from the first header to immediately before the next first header. In addition, each 1H waveform value data field includes a large number of sub 1H waveform data blocks in a micro structure. Each sub 1H waveform data block is comprised of a second header (or a sub 1H header) and a second data or sub 1H waveform value data field.

More specifically, the 1H header comprises four fields which are labeled Next Burst Read Address, Burst Data Block Length, Repeat H Number, and Repeat Burst Read Address. Each of the fields is comprised of one 16-bit word. These fields are defined as follows.

(1) Next Burst Read Address:

This field refers to the start address of a data block which is executed when a data block next to an associated 1H waveform data block is selected ("Select Next Data Block") after this 1H waveform data block.

Specifically, the next data block is read when a registered repetition count value (reptREG), later described, is zero, and this address is ignored when the registered repetition count value is not zero.

(2) Repeat Burst Read Address:

This field refers to the start address of a data block which should be next read after the execution of an associated data block when "Select Data Block In Repetition" is executed.

This address is ignored when the registered repetition count value is zero, and used when the registered repetition count value is not zero.

(3) Burst Data Block Length:

This field refers to the length of the 1H waveform value data field subsequent to the 1H header in an associated 1H data block.

(4) Repeat H Number:

This field refers to the number of repetitions of a sequence or a set of 1H waveform data blocks with an associated 1H waveform data block or data block located at the head.

Repeat H Number set to zero means "Select Next Data Block" when the registered repetition count value is zero, causing a transition to the processing on the next block after the sequence or set of 1H waveform data block is processed only once. The number set to non-zero means "Select Data Block In Repetition." When a sequence of data blocks is repeated in this "Select Data Block In Repetition," a repeat address of the first data block is set to the address of the immediately following data block within the sequence of data block; a repeat address of an intermediate data block is similarly set to the address of a data block immediately following this intermediate data block; and a repeat address of the last data block is set to the address of the first data block. As a result, while "Select Block Data In Repetition" is valid, a sequence of such data blocks is repeatedly read out.

Figure 5B:
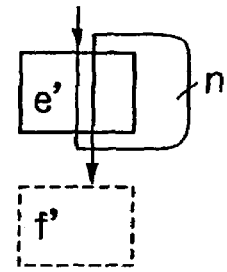
Figure 5C:
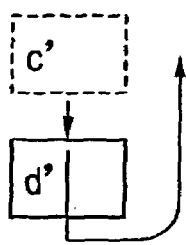
Figure 5D:
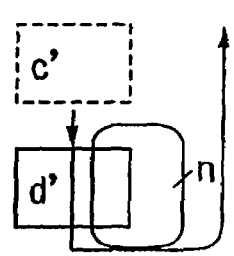
Figure 5E:
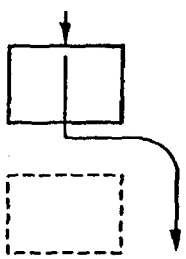
Figure 5F:
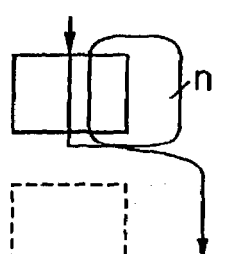
Figure 5G:
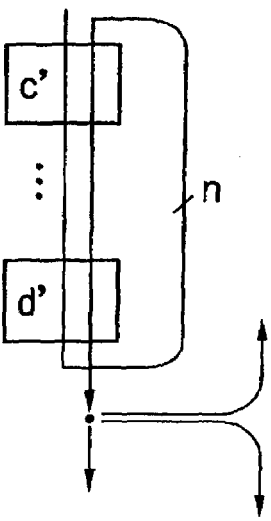

Referring now to FIGS. 5A-5G, description will be made on a control or processing associated with the order/arrangement pattern of macro waveforms implemented by the 1H header. In FIG. 5, respective blocks drawn in solid lines or dotted lines represent respective 1H waveform data blocks, and symbols such as a', b' and the like within the blocks indicate, by way of example, the symbols in the waveform synthesis data in FIG. 2. First, FIG. 5A shows a simple transition from a block a' to the next block b', in which case Next Burst Read Address is set to the start address of the block b', and Repeat H Number is equal to zero. It should be noted that Repeat Burst Read Address is set identical to Next Burst Read Address because no block is repeated. Next, FIG. 5B shows n repetitions of a block e' followed by a transition to the immediately following block f', where n is equal to or larger than two (n=2). In this case, Next Burst Read Address is set to the start address of the block f', Repeat Burst Read Address is set to the start address of the block e', and Repeat H Number is equal to n. FIG. 5C shows an example of a jump from a block d' back to a block (not shown) prior to a block c'. In this case, Next Burst Read Address is set to the start address of the preceding block, and Repeat Burst Read Address is set identical to Next Burst Read Address. It should be noted that the state shown in FIG. 5C does not exist in the example shown in FIG. 2. FIG. 5D differs from FIG. 5C in that the block d' is repeated n times. In this case, Repeat H Number is equal to n, and Repeat Burst Read Address is set to the start address of the block d'. Next, FIG. 5E shows, unlike FIG. 5C, a jump to a back or block, by way of example, in which case a difference lies only in that Next Burst Read Address and Repeat Burst Read Address are simply set to the start address of the destination block. Though substantially identical to the example in FIG. 5D, FIG. 5F differs in that n repetitions are followed by a jump to a back block. In this case, therefore, a difference lies only in that Next Burst Read Address is set to the start address of the destination block. FIG. 5G shows, by way of example, n repetitions of a sequence of blocks followed by a transition to the immediately following block, or a jump to a front or a back block. In this case, in the block c', Repeat Burst Read Address is set to the start address of the immediately following address (the block d' when there are only two blocks, and Repeat H Number is equal to n. In this case, Next Burst Read Address is set identical to Repeat Burst Read Address. Next, when an intermediate block (not shown) exists between the block c' and block d', Next Burst Read Address of this intermediate block is set to the start address of the block immediately after this block, and Repeat H Number is equal to zero. Consequently, Repeat Burst Read Address is made identical to Next Burst Read Address. Next, in the last block d', Repeat Burst Read Address is set to the start address of the block c'. In the block d', Repeat H Number is equal to zero, and Next Burst Read Address is set to the start address of a block which is targeted after the end of the sequence of blocks. In this case, for enabling a loop from the block d' to the block c', a synchronization signal generator B according to one embodiment illustrated in FIG. 6 employs a variable called the registered repetition count value (reptREG), as will be later described. While several examples have been shown as to methods of selecting macro waveform data blocks, those skilled in the art should be able to employ a selecting method other than the illustrated ones.

Next, the sub 1H header will be described. The sub 1H header is comprised of four 16-bit word fields which are a data length (high byte) (DATA LENGTH (High Byte)), a data length (low Byte) (DATA LENGTH (Low Byte)), a start trigger point (high byte) (START TRIG POINT (High Byte)), and a start trigger point (low byte) (START TRIG POINT (Low Byte)). These fields are defined as follows.

(1) Data Length (High Byte) and Data Length (Low Byte):

These two fields represent in combination the length of a sub 1H waveform value data field subsequent to this header.

(2) Start Trigger Point (High Byte) and Start Trigger Point (Low Byte):

These two fields represent in combination the timing for triggering the start of using a waveform value included in the data field.

The sub 1H waveform value data field subsequent to the sub 1H header includes only waveform values in a level changing portion of those micro waveforms associated with this sub 1H waveform data blocks. Waveform value data are omitted for a constant level portion of the micro waveforms, and are generated by using the level, as it is, at a trailing end of an adjacent level changing portion. It should be noted that in the data structure shown in FIG. 4, a sub 1H waveform data block at the end of the 1H waveform data block does not have the waveform value data field, and this block is merely included as a dummy for matching the length of the 1H waveform data block.

Figure 7:
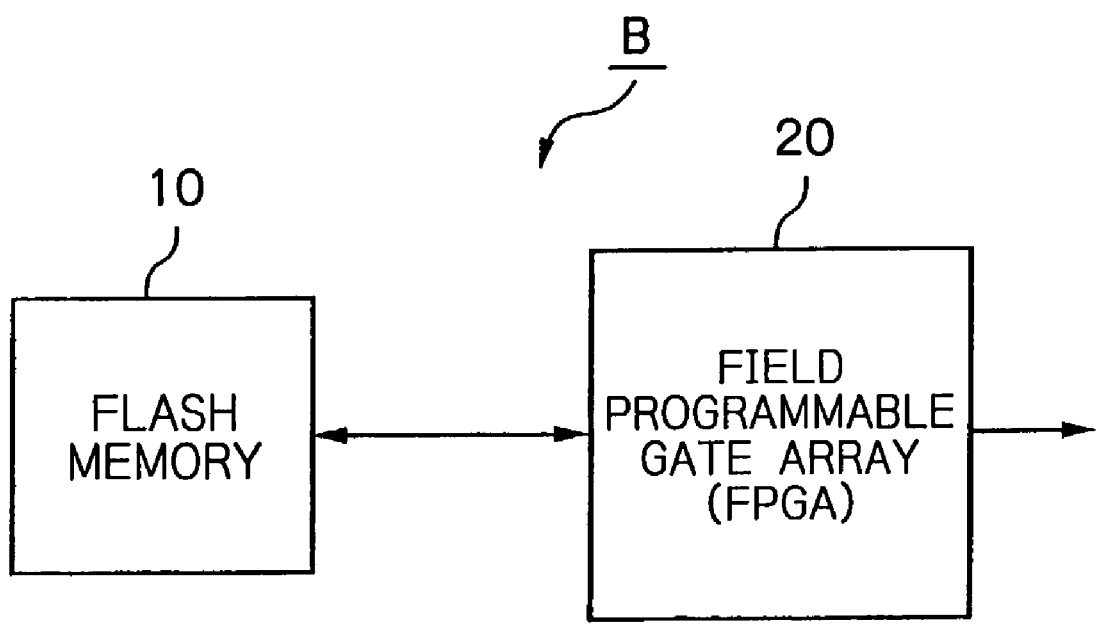
FIG. 7 is a block diagram illustrating a specific circuit configuration which implements the synchronization signal generator B in FIG. 6.

Referring next to FIGS. 6, 7 and 8, description will be made on a synchronization signal generator B according to one embodiment of the present invention which is configured to use data for synthesizing a synchronization signal, having the data structure shown in FIG. 4. FIG. 6 illustrates the synchronization signal generator B in block diagram form, while FIG. 8 generally shows data processing in the generator B. Specifically, the synchronization signal generator B illustrated in FIG. 6 comprises a low speed flash memory 10; a header section control instruction controller 30, a pair of dual port memories 50 and 52 faster than the flash memory 10; a header section control instruction controller 70; and other components, as illustrated, corresponding to the respective components 1, 3, 5 and 7 in the waveform synthesizer A in FIG. 1. As illustrated in FIG. 7, the components other than the flash memory 10 in FIG. 6, for example, in the synchronization signal generator B may be implemented by a field programmable gate array (FPGA).

The flash memory 10 stores waveform synthesis data having the aforementioned structure for generating a synchronization signal. The data structure is again shown in FIG. 8A, and includes 1H waveform data blocks a, b, c, d, e, f, g, h, and the like as shown in FIG. 8B. The flash memory 10 receives a clock FMclk as an operation clock. The flash memory 10 is also connected to respond to a control from a CPU (not shown) and a control from the header section control instruction controller 30 and to receive an address signal from a multiplexer (MUX) 14. The multiplexer 14 is connected to receive an initial address from a burst address initial value register 12; a next address (i.e., the address of the next data block) or a repeat address from the header section control instruction controller 30; and a read/write address from the CPU, as address inputs, and respond to the control from the CPU and the control from the header section control instruction controller 30. The initial address stored in the burst address initial value register 12 and received from the CPU indicates an initial address of waveform synthesis data in the flash memory 10 for generating a synchronization signal of a particular type. The CPU can specify an arbitrary one of various types of synchronization signals using the initial address.

Summarizing now the control conducted by the CPU, the CPU controls two operations, i.e., a selection of the type of a synchronization signal which should be generated from a plurality of synchronization signals previously written into the flash memory 10, and a write and a rewrite into the flash memory 10. More specifically, the CPU controls the selection of an operation mode (mode such as a synchronous burst read) for the flash memory 10, a write into the burst address initial value register 12, switching of input in the MUX 14, and switching of a bidirectional bus buffer through a control bus in accordance with each operation. The CPU also supplies a read/write address to the flash memory 10 through an address bus. The CPU further applies an initial address to the burst address initial value register through a data bus upon selecting the type of synchronization signal, and applies a data to be written into the flash memory 10 through a bidirectional bus buffer when the flash memory 10 is rewritten. The CPU further controls a horizontal counter and a vertical counter, later described, and supplies data to these counters.

The header section control instruction controller 30, which is responsible for processing the macro header, comprises an input for receiving a first header (macro header) in a 1H waveform data block read from the flash memory 10 at a burst; an input/output for exchanging signals with the header section control instruction controller 70; an output for generating a next address to the MUX 14 as described above; and an output to a dual port memory write address counter 32. The dual port memory write address counter 32 enables the high speed dual port memories 50 and 52 to be alternately written, thereby temporarily storing low rate data from the low speed flash memory 10. Each of the paired dual port memories 50 and 52 further comprises an address input for receiving a write address from the write address counter 32; a data input for receiving data (corresponding to intermediate waveform data) read from the flash memory 10; and a clock input for receiving a clock Fclk for controlling the operation. FIG. 8C shows an example of data (indicated by "write") written into two dual port memories or memories A and B. Each of the memories 50 and 52 further comprises a control input for receiving a control signal from the header section control instruction controller 70 for alternately reading from these memories A, B; an address input for receiving a read address from the dual port memory read address counter 72; and a data output for outputting read data. FIG. 8C shows an example of data (indicated by "read") alternately read from the dual port memories A and B. The multiplexer (MUX) 54, which has inputs for receiving data outputs from the memories 50 and 52, respectively, comprises an output for generating a multiplexed data output (shown in FIG. 8G) of the data from the memories 50 and 52; and a control input for receiving a signal from the header section instruction controller 70 for controlling this multiplexing operation. The data output of the MUX 54 is supplied to a data input of a register 74.

As described above, the header section control instruction controller 70 comprises a control output for alternately using the dual port memories, and an output connected to the input of the dual port memory read address counter 72 for the alternate reading. The header section control instruction controller 70 also comprises inputs for receiving signals from the horizontal counter 76 and vertical counter 78 for a synchronous operation. The horizontal counter 76 is connected to receive the clock Fclk, while the vertical counter 78 is connected to receive the output from the horizontal counter 76. FIG. 8D shows outputs of the horizontal/vertical counters (a combination of the horizontal counter output and vertical counter output). The header section control instruction controller 70 further comprises an input connected to the output of the MUX 54 for the processing based on the received second header (sub 1H header); and an output for supplying a hold signal to the register 74 based on the processing. The hold signal, which is indicated by "hold data" in FIG. 8E, is used for forming a constant level portion in a sub 1H waveform. The register 74 also comprises an input for receiving the clock Fclk for the synchronous operation, and an output for generating synchronization signal waveform data which is a final target waveform. FIG. 8F shows an exemplary waveform of the synchronization signal.

Figure 9:
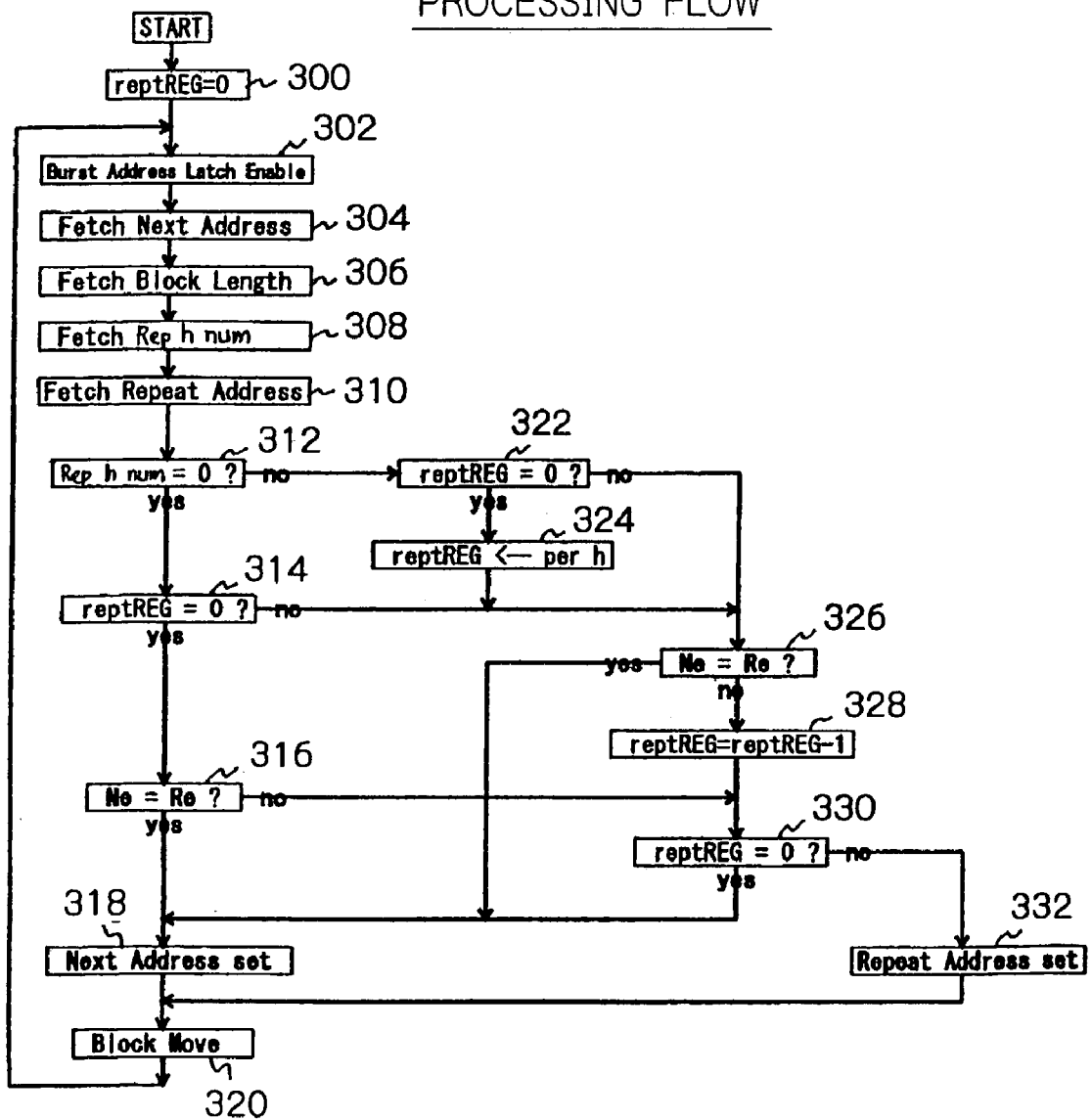
FIG. 9 is a flow chart illustrating a 1H header (first header) processing flow in a header section control instruction controller in FIG. 6.

Referring next to FIG. 9, a 1H header (first header) processing flow will be described in detail in the header section control instruction controller 30 in FIG. 6. This flow decompresses waveform synthesis data at the macro level to produce intermediate data for waveform synthesis. First, at step 300, controller 30 initializes the registered repetition count value (reptREG) to zero. Next, at step 302, the controller 30 outputs a burst address latch enable to the MUX 14 to supply the flash memory 10 with an address from the initial value register 12. In this way, the block a (FIG. 8) is read from the flash memory 10. Next, at steps 304-310, the controller 30 fetches data or instruction words in the 1H header of the block a, i.e., the next address, the block length, Repeat H Number, and the repeat address. Next, at step 312, it is checked to determine whether or not Repeat H Number is zero. If NO, it is checked to determine at step 314 whether or not the registered repetition count value is zero, i.e., whether or not a certain block is repeated (for example, the blocks a, b and the like in FIG. 2) or whether or not this is the last repetition (for example, the second block d or the second block e in FIG. 2). If YES, the flow proceeds to step 316, where it is checked to determine whether or not the next address (Ne) is equal to the repeat address (Re), i.e., whether or not a block of interest is not repeated (for example, the blocks a, b and the like in FIG. 2), or otherwise whether or not the block is repeated at the last time (for example, the second block d or the second block e in FIG. 2). If YES, indicating that the block is not repeated, the next address fetched at step 304 is set as a burst read address for the frame memory which is used at the next time. After this step, the waveform data field in the 1H waveform data block (for example, the block a in FIG. 2) is moved in block to the dual port memory A in blocks at step 320, as indicated by "Write a" in FIG. 8C. Then, the flow loops back to step 302.

If NO at step 312, i.e., when the block is involved in a repetition, the flow proceeds to step 322, where it is checked to determine whether or not the registered repetition count value is zero, i.e., whether or not this is the first block in a sequence of repeated blocks. When this is the first block, the flow proceeds to step 324, where Repeat H Number is set to the registered repetition count value, followed by the flow proceeding to step 326, as is the case with NO at step 322. At step 326, it is checked to determine whether or not the block is other than the last block in the sequence of repeated blocks. If YES, the flow proceeds to steps 318, 320 for executing the aforementioned processing. On the other hand, if NO at step 326, i.e., when the block is the last one in the sequence of repeated blocks, or is a single repeated block, the flow proceeds to step 328, where the registered repetition count value is decremented by one. This means that one repetition is finished in this pass. Next, it is checked to determine at step 330 whether or not the registered repetition count value is zero, i.e., whether or not the block is the last one in a repetition (the last one of continuous repetitions of one block, or the last block in the last repetition pass in a sequence of continuously repeated blocks). If YES, the flow proceeds to steps 318 and 320. On the other hand, if NO at step 330, the flow proceeds to step 332, where the repeat address fetched at step 310 is set as a burst read address of the flash memory 10 which is used at the next time. Subsequently, the flow proceeds to step 320, where the controller 30 moves the 1H waveform value data field in the block to the dual port memory in blocks.

Collectively describing the foregoing operation in the example shown in FIG. 2, the blocks a and b are generated as a result of YES at steps 312, 314 and 316. The first block c is generated as a result of NO at step 312 and YES at steps 322 and 326. The first block d is generated as a result of YES at step 312 and NO at steps 314, 326 and 330. The second block c is generated as a result of NO at steps 312 and 322 and YES at step 326. The second block d is generated as a result of YES at steps 312 and 314, NO at step 316, and YES at step 330. Next, the first block e is generated as a result of NO at step 312, YES at step 322, and NO at steps 326 and 330, while the second block e is generated as a result of NO at step 312, YES at step 322, NO at step 326, and YES at step 330. In the foregoing manner, a certain pattern of combination of synchronization signals is generated, and after the generation of the last synchronization signal, the first synchronization signal is again generated.

Figure 10:
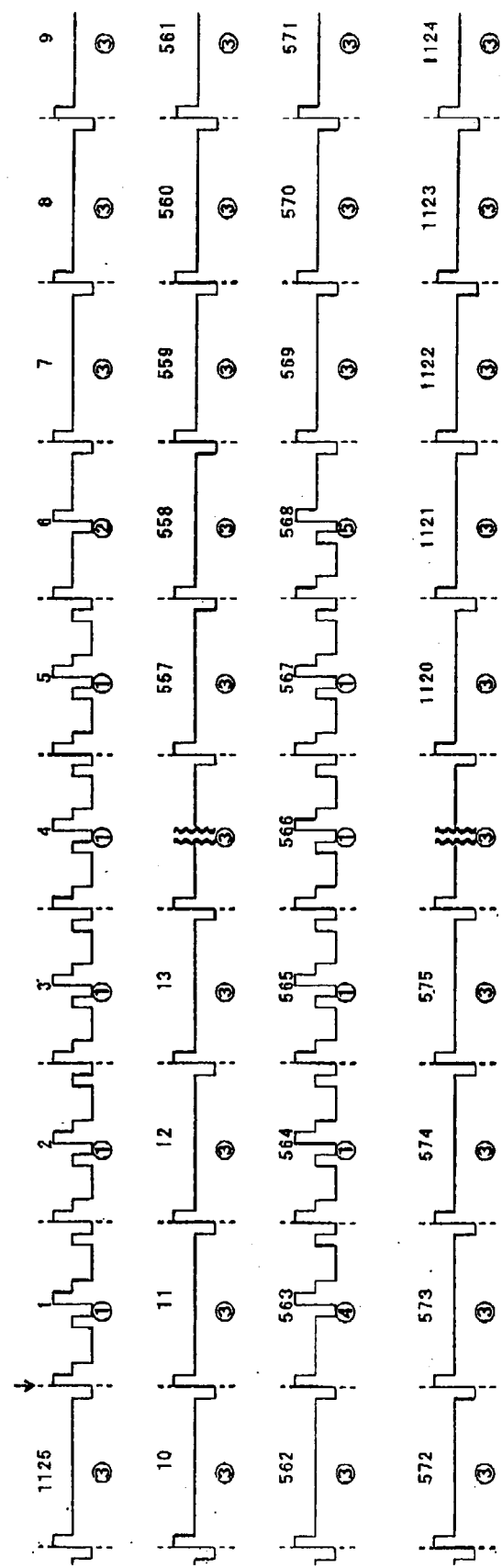
FIG. 10 is a diagram showing an exemplary synchronization signal pattern generated by the synchronization signal generator B in FIG. 6.
Figure 11:
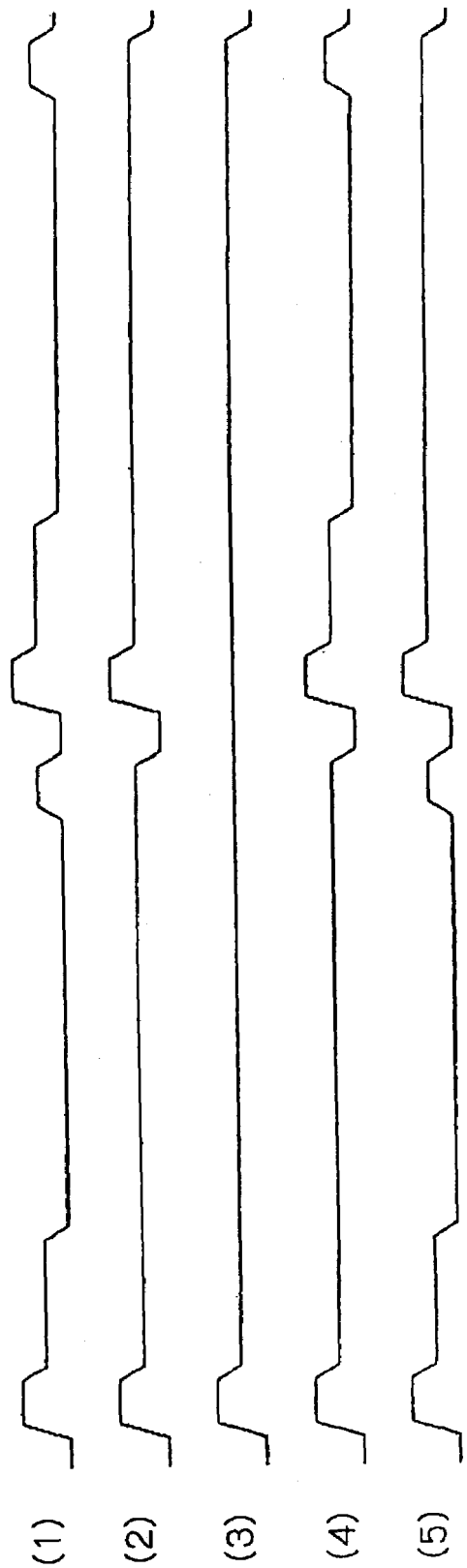
FIG. 11 is a waveform chart showing five different 1H synchronization signal waveforms which make up the synchronization signal pattern shown in FIG. 10.

Referring now to FIGS. 10 and 11, a synchronization signal pattern generated in the present invention will be described in connection with a specific example thereof. While the synchronization signal shown herein is in a so-called "1125i" format, the present invention can be applied as well to other synchronization signal patterns, for example, "525i SYNC," "525p SYNC," and "NTSC BB." The "1125i" synchronization signal pattern shown in FIG. 10 is comprised of five different 1H synchronization signal waveforms (1)-(5) shown in FIG. 11, and is built by repeatedly generating the 1H waveform (1) five times, generating the waveform (2) once, repeatedly generating the waveform (3) 556 times, generating the waveform (4) once, repeatedly generating again the waveform (1) four times, generating the waveform (5) once, and repeatedly generating again the waveform (3) 557 times. FIG. 10 shows the numbers 1 to 1125 indicating 1H periods, and the waveform numbers (1)-(5) shown in FIG. 11 in each 1H period. According to the present invention, waveform synthesis data simply need to include the 1H waveforms in the order of (1), (2), (3), (4), (1), (5), (3) for generating this synchronization signal pattern. It should be noted that the macro header structure shown in FIG. 4 is intended to permit only a relatively simple waveform selection/arrangement order for achieving a high speed operation, so that the waveforms (1) and (3) are included twice. In this example, the two duplicated waveforms (1) and (3) respectively constitute a unique waveform which bases the repeated processing in addition to one each of the five waveforms (1)-(5). However, a more complicated macro header structure may be employed to eliminate the need for duplicating any 1H waveform data and to build a unique waveform from only one each of the five waveforms.

Figure 12:
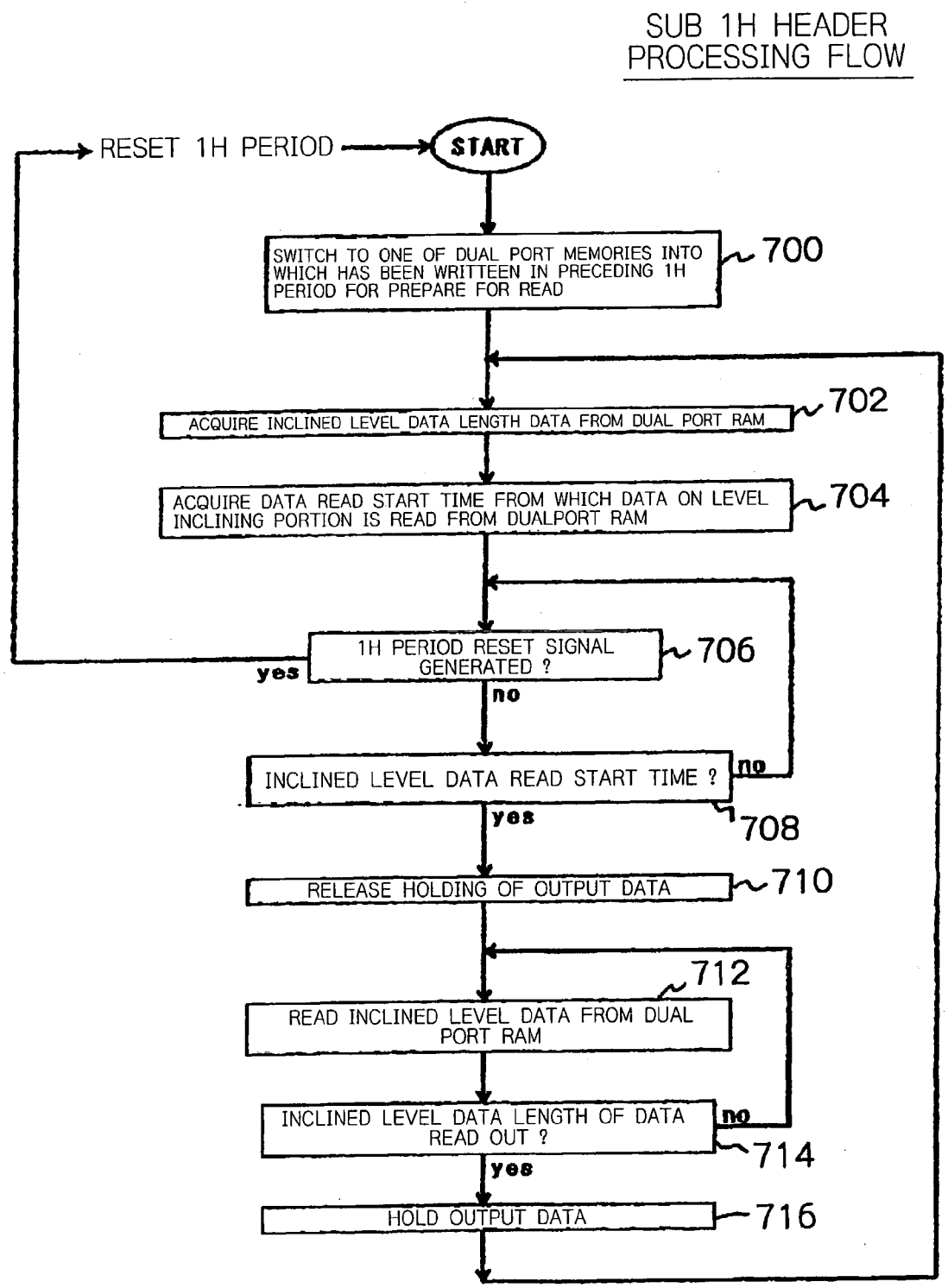
FIG. 12 is a flow chart illustrating a sub-1H header (second header) processing flow in the header section control instruction controller in FIG. 6.
Figure 13:
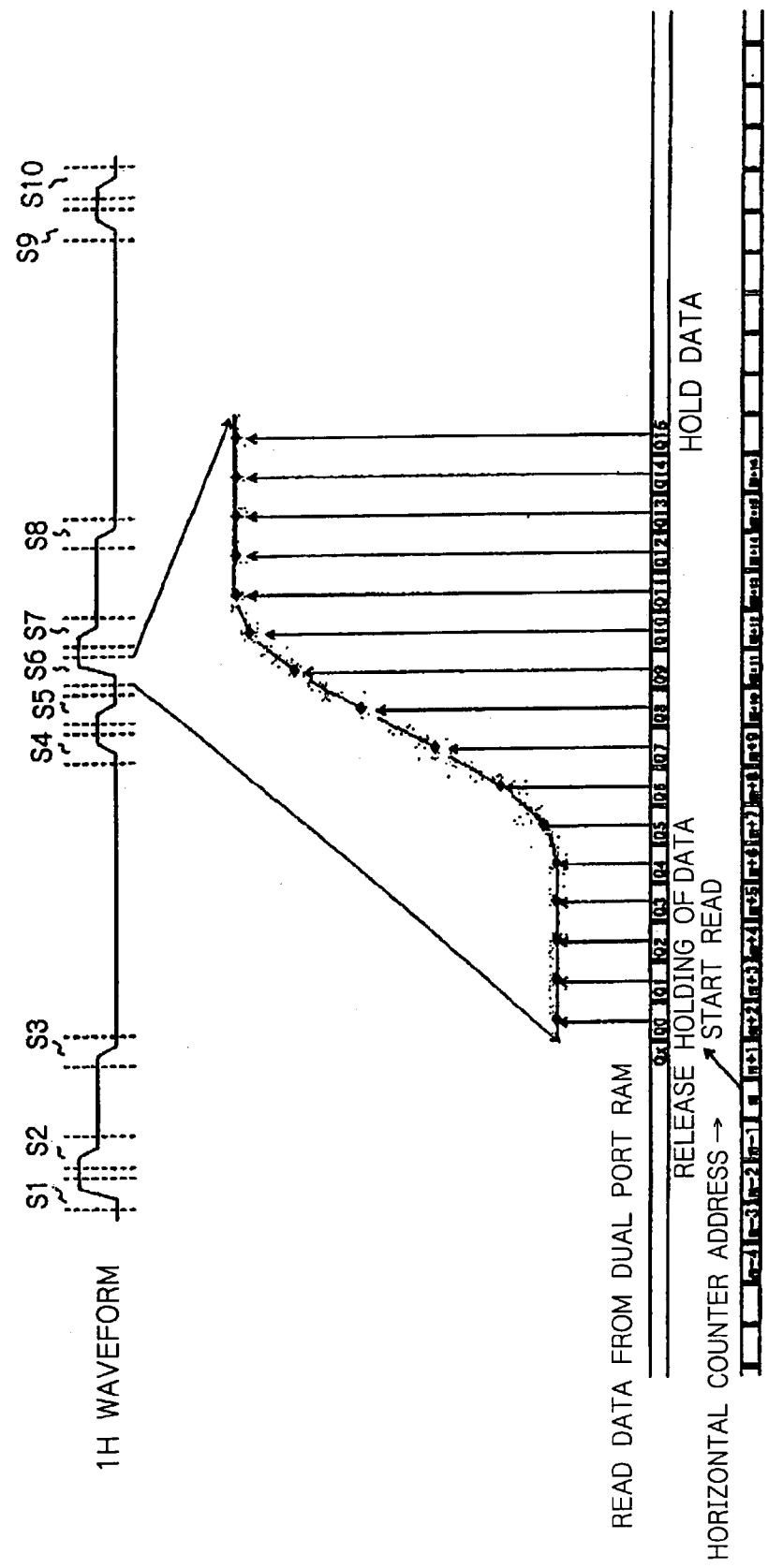
FIG. 13 is a timing diagram showing the relationship among a 1H waveform (1) shown in FIG. 11, waveform value data read from dual port memories, and a horizontal counter address.

Next, a sub 1H header (second header) processing flow in the header section control instruction controller 70 in FIG. 6 will be described in detail with reference to a flow chart of FIG. 12 and a timing diagram of FIG. 13. FIG. 13 shows the relationship among the 1H waveform (1) shown in FIG. 11, waveform value data read from the dual port memories, and the horizontal counter address. As shown in FIG. 13, the 1H waveform has ten level inclining portions S1-S10, so that the sub 1H waveform data block is comprised of ten blocks corresponding to these level inclining portions. It should be noted that in the present invention, the sub 1H waveform value data field of each sub 1H waveform data block is compressed at the micro level, so that it only comprises waveform value data on the level inclining portion without data on a constant level portion anteceding the level inclining portion. FIG. 13 shows the waveform of one S6 of the level inclining portions in enlarged view. As can be seen from FIG. 13, the data on the level inclining portion includes data on an inclined portion and data on slight constant level portions preceding and subsequent thereto. The processing flow illustrated in FIG. 12 decompresses the data at the micro level to convert the intermediate data for waveform synthesis to a target waveform.

The processing flow will be described in detail with reference to FIG. 12. First, at step 700, preparation is made, in a 1H period of interest, for a read from one of the dual port memories into which data has been written in the preceding 1H period. For example, in FIG. 8C, when the waveform data a is written into the dual port memory A in the preceding 1H period, the dual port memory B is read in the same period. At the outset of the next 1H period, preparation is made for a read from the memory A, opposite to the preceding period. This is intended for alternate writes and alternate reads to and from the dual port memories. Next, at steps 702 and 704, operation is performed to acquire data or instruction words in the header, i.e., the data length of a level changing portion or level inclining portion (see FIG. 4), and a read start trigger point, i.e., the time at which a read is started from the dual port memory. Next, it is checked to determine at step 706 whether or not a 1H period reset signal is generated, i.e., the 1H period is over. The reset signal is formed from a signal from the horizontal counter 76 in FIG. 6. When the 1H period is not over, the flow proceeds to step 708, where it is checked to determine whether or not an inclined level read start time is reached. For example, in the example of FIG. 13, it is determined whether or not the horizontal counter address reaches "m." If NOT, the flow loops back to step 706 to wait until the horizontal counter address reaches "m." On the other hand, if YES, a hold signal for the register 74 is made inactive at step 710 to release the holding of output data. Next, at step 712, inclined level data from the dual port memories begins to be read. In the example of FIG. 13, after the delay of one horizontal counter address, sequential read of 16 waveform value data Q0-Q15 from the dual port memories starts at the time indicated by the counter address "m+2", thereby reading data Q0 first. Next, at step 714, it is checked to determine whether or not the inclined level data length of data has been read. If NOT, the flow loops back to step 712 to repeat steps 712 and 714. By repeating the loop, the controller 70 reads up to data Q15, and the flow proceeds from step 714 to step 716 when the read is finished. At step 716, the hold signal for the register 74 is made active to hold the output of the register 74 to form a waveform in a constant level portion. After step 716, the flow loops back to step 702 for generating the next level inclining portion. In this way, waveforms of level inclining portions S1-S10 and intervening constant level portions are generated. When the last level inclining portion S10 has been generated, causing YES at step 706 (no valid data is acquired at steps 702 and 704), the flow returns to the starting step, thus terminating the synthesis of the 1H waveform, followed by a transition to the synthesis of the next 1H waveform.

Figure 14:
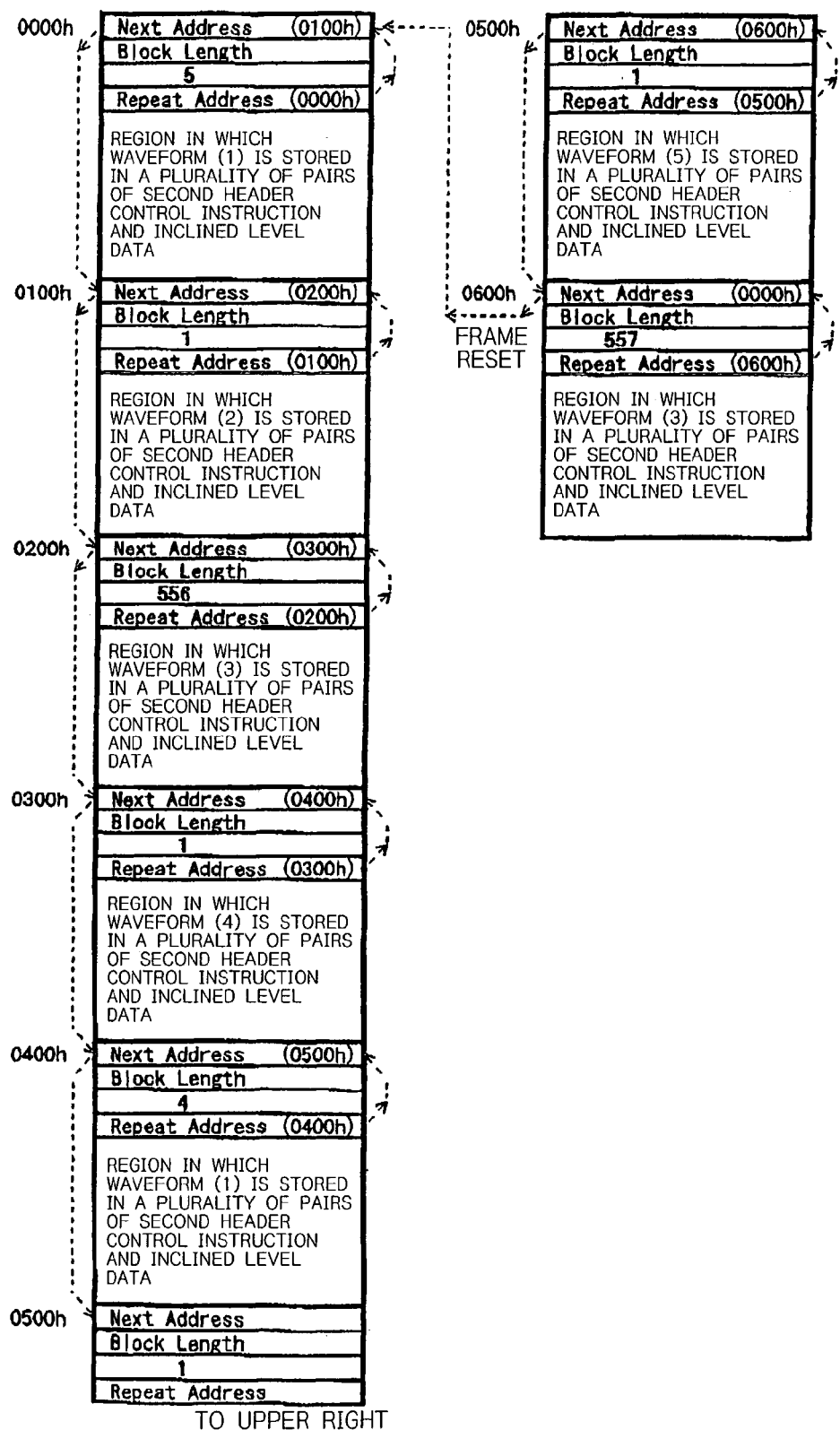
FIG. 14 is a diagram showing a specific example of waveform synthesis data for the synchronization signal in the pattern shown in FIGS. 10 and 11.

FIG. 14 shows a specific example of waveform synthesis data for the synchronization signal in the pattern shown in FIGS. 10 and 11. The waveform synthesis data is stored in the flash memory 10 (FIG. 6). For simplifying the illustration, the 1H waveform data blocks have the same length. Also, data in the 1H waveform value data field is omitted for simplifying the illustration. In FIG. 14, dotted lines simply indicate addresses indicated by the contents of the next address field and repeat address field.

Figure 15:
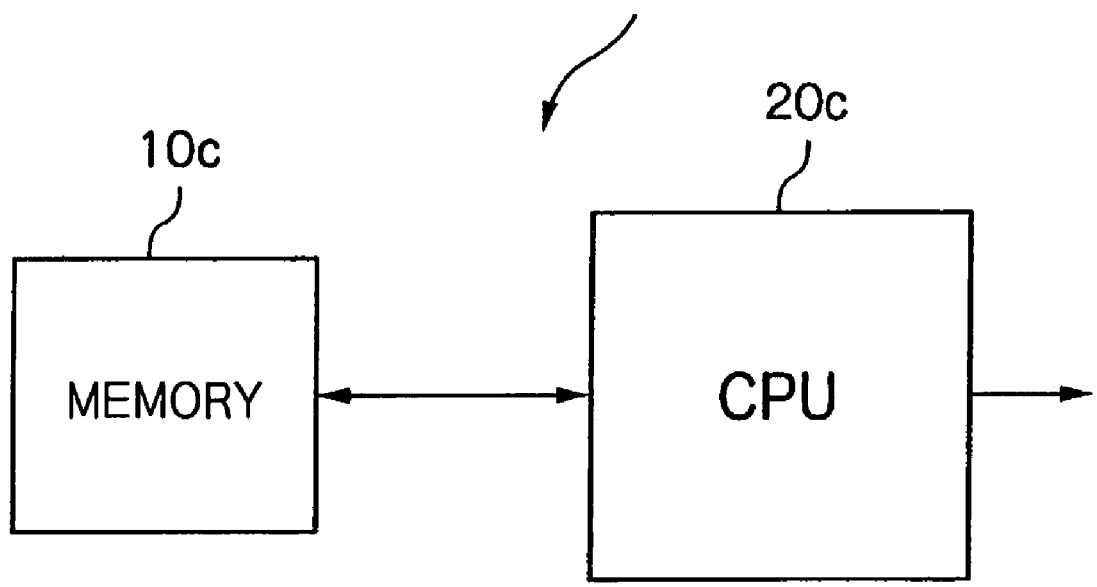
FIG. 15 is a block diagram illustrating the configuration of another embodiment of the synchronization signal generator B illustrated in FIG. 7.

Referring next to FIG. 15, description will be made on another embodiment of the synchronization signal generator B illustrated in FIGS. 6 and 7. The synchronization signal generator C in this embodiment differs from the embodiment illustrated in FIG. 6 in that a CPU 20c is used instead of the FPGA 20 shown in FIG. 7. The use of the CPU 20c enables flexible execution of more complicated processing than the FPGA 20. While the FPGA is generally advantageous over the CPU in regard to the operating speed, a CPU-based configuration can also achieve a high-speed operation similar to the FPGA in an environment in which a high speed CPU can be employed. Also, the CPU-based configuration can advantageously form signal waveforms for synchronization signals and the like by use of the waveform synthesis data and waveform synthesis programs illustrated in FIGS. 9 and 12 even in a general personal computer environment.

Various modifications may be made to the embodiments of the present invention so far described in detail. First, the macro header may be arbitrarily designed in a structure other than the structure shown in FIG. 4. This is because of the following reason. Since the data structure of the macro header depends on the compression performed on the waveform synthesis data, particularly on the macro level compression, by way of example, different data may be required for decompression depending on an employed compression method. In addition, while the foregoing embodiments have been described in connection with exemplary waveforms which are compressed both at the macro level and at the micro level, the present invention may be applied to waveforms which are compressed only at one of these levels, thereby integrating compressed waveform value data with data for decompressing the waveform value data.

The present invention described above can increase the integrity of waveform synthesis data, thereby storing the entire data in a single memory. As a result, since modifications to waveform data can be facilitated, the waveform can also be readily modified. Also, a header including instruction words can be combined with waveform value data associated therewith to facilitate the integration with waveform value data section. Further, the use of the header permits the compression of waveform value data at the macro level as well as at the micro level, thereby reducing the amount of data and saving the memory. In addition, a CPU, when used, can provide a highly generalized waveform synthesis method without requiring dedicated hardware.

What is claimed is:

1. A waveform synthesizer for synthesizing a target waveform from waveform synthesis data, comprising:
  a) a storage that stores waveform synthesis data, said waveform synthesis data including waveform unit section data blocks associated with a plurality of unique waveform unit sections, said target waveform including a plurality of waveform unit sections including repetition of at least one said unique waveform unit section, each said waveform unit section data block including a waveform value data section including source waveform value data, and a control section including control data for controlling use of said source waveform value data, said control data of a particular waveform unit section data block comprising:
  a next address representing an address for a data block to be read subsequent to said particular data block (i) if the particular data block is not associated with the repetition, (ii) if the particular data block is associated with the repetition and when the particular data block is a last data block in one or more data blocks to be repeated and if the repetition is complete, or (iii) if the particular data block is associated with the repetition and when the particular data block is an intermediate data block between first and last data blocks in the one or more data blocks to be repeated, and
  a repeat address representing an address for a data block to be read subsequent to said particular data block if said particular data block is associated with the repetition; and
  a repeat number representing a number of repetitions if said particular data block is associated with the repetition and when said particular data block is a first data block in the one or more data blocks to be repeated; and b) a controller that is coupled to said storage and that uses the source waveform data included in said waveform value data section of said waveform synthesis data in response to said control data included in said control section of said waveform synthesis data received from said storage to generate an output data representative of the plurality of waveform unit sections of a target waveform, said controller including a repetition controller that determines, based on a repeat variable generated from the control data, the waveform unit section data blocks to be subsequently used;

wherein said waveform unit section comprises at least one waveform segment section. and each waveform segment section comprises one constant level portion in which a level does not change, and one level changing portion in which a level changes;

wherein:

said waveform value data section of said waveform unit section data block includes a waveform segment section data block associated with each said waveform segment section and said waveform segment section data block includes:

a second waveform value data section including data indicative of the level of said one level changing portion of said waveform segment section: and a second control section including timing data, said timing data indicating a period in which level data is used associated with said level changing portion included in said second waveform value data section; and wherein said timing data indicates said constant level portion in a period until the period in which said level data is used;

said waveform synthesizer further comprising:

a) a second storage that is coupled to said controller and that stores said waveform segment section data blocks associated with each of waveform unit sections of said target waveform from said controller; and b) a second controller that is coupled to said second storage and that controls each said waveform segment section data block received from said second storage, said second controller configured to form target waveform value data representative of said constant level portion from said timing data in said second control section within said waveform segment section data block received from said second storage by maintaining the level constant until a period in which said level data in said second waveform value data section within said waveform segment section data block is used, and to form target waveform value data representative of said level changing portion using said level data from said second waveform value data section of said waveform segment section data block when said used period indicated by said timing data is reached.

2. A waveform synthesizer according to claim 1, wherein said repetition controller comprises:

a generator that generates said repeat variable from said control data, said repeat variable being set to the repeat number if a repeat number is set for the particular data block, said repeat variable being decremented at the last data block in the one or more data blocks to be repeated;

a selector that selects the repeat address for reading from the storage if the repeat variable indicates that one or more repetitions remain, and otherwise selects the next address for reading from the storage.

3. A waveform synthesizer according to claim 1. wherein: said storage is a flash memory; and said second storage comprises two dual port memories which are alternately used.

* * * * *